US009562642B2

(12) United States Patent
Nomura et al.

(10) Patent No.: US 9,562,642 B2
(45) Date of Patent: Feb. 7, 2017

(54) FOAMABLE FILLING DEVICE

(75) Inventors: Koji Nomura, Aichi (JP); Hiroyuki Sakai, Saitama (JP)

(73) Assignees: IIDA INDUSTRY CO., LTD., Aichi (JP); HONDA MOTOR CO., LTD., Tokyo (JP)

( * ) Notice: Subject to any disclaimer, the term of this patent is extended or adjusted under 35 U.S.C. 154(b) by 118 days.

(21) Appl. No.: 14/004,621

(22) PCT Filed: Feb. 21, 2012

(86) PCT No.: PCT/JP2012/054127
§ 371 (c)(1),
(2), (4) Date: Sep. 11, 2013

(87) PCT Pub. No.: WO2012/124439
PCT Pub. Date: Sep. 20, 2012

(65) Prior Publication Data
US 2014/0000739 A1   Jan. 2, 2014

(30) Foreign Application Priority Data

Mar. 11, 2011   (JP) .................. 2011-054653

(51) Int. Cl.
*F16K 15/03* (2006.01)
*F16K 15/18* (2006.01)
(Continued)

(52) U.S. Cl.
CPC .............. *F16L 55/10* (2013.01); *B29C 44/581* (2013.01); *F16K 1/20* (2013.01); *F16K 15/181* (2013.01);
(Continued)

(58) Field of Classification Search
CPC .................... Y10T 137/7898; Y10T 137/7891; Y10T 137/7902; Y10T 137/7874; Y10T 137/7875; Y10T 137/7893; Y10T 137/7856; F16K 15/03; F16K 15/031; F16K 15/033; F16K 15/181; F16K 1/18; F16K 1/20
(Continued)

(56) References Cited

U.S. PATENT DOCUMENTS 1,266,130 A * 5/1918 Kimbler ................... 137/527
4,034,780 A * 7/1977 Horvath ............. F16K 15/03
137/146
(Continued)

FOREIGN PATENT DOCUMENTS

AU   WO 2010091474 A1 *   8/2010 ........... F16K 15/033
CN   1606513                4/2005
(Continued)

OTHER PUBLICATIONS

International Report on Patentability and Written Opinion for PCT/JP2012/054127; dated Sep. 26, 2013.
(Continued)

*Primary Examiner* — Mary McManmon
*Assistant Examiner* — Hailey K Do
(74) *Attorney, Agent, or Firm* — Renner, Otto, Boisselle and Sklar LLP

(57) ABSTRACT

Provided is a foamable filling device that includes a foamable material and is disposed within a hollow structural member. The foamable filling device includes a carrier member and an opening/closing member. The carrier member includes a through hole and a mounting portion to which the foamable material is mounted. The opening/closing member includes a cover portion formed in a size capable of blocking the through hole; and a biasing portion that biases the cover portion, and the opening/closing member is fittable to the carrier member. The opening/closing member is configured such that, when the opening/closing member is
(Continued)

fitted to the carrier member, the biasing portion is elastically deformed and biases the cover portion to thereby bring the cover portion into contact with a seat portion provided at an end of the through hole of the carrier member.

9 Claims, 15 Drawing Sheets

(51) Int. Cl.
    F16K 1/20      (2006.01)
    F16K 15/00     (2006.01)
    F16K 17/00     (2006.01)
    F16K 21/04     (2006.01)
    F16K 15/16     (2006.01)
    F16L 55/10     (2006.01)
    B29C 44/58     (2006.01)
(52) U.S. Cl.
    CPC ........ F16K 15/031 (2013.01); Y10T 137/7893 (2015.04); Y10T 137/7902 (2015.04); Y10T 137/9247 (2015.04)
(58) Field of Classification Search
    USPC ..... 251/82, 83, 149.2, 149, 142, 144, 149.6, 251/147; 137/855–857, 625.44, 625.45, 137/527, 527.6, 852, 800, 15.01, 15.02, 137/15.08, 15.17, 15.18, 515–515.7; 166/332.8, 325–327; 220/203.01–203.29; 277/314
    See application file for complete search history.

(56) References Cited

U.S. PATENT DOCUMENTS

| 4,248,279 | A | * | 2/1981 | Warmbold ..................... 141/348 |
| 4,527,601 | A | * | 7/1985 | Middleton ............. B60K 15/04 141/348 |
| 4,901,395 | A | * | 2/1990 | Semrau ............... B60R 13/0846 16/2.2 |
| 6,227,299 | B1 | * | 5/2001 | Dennistoun ................ 166/332.8 |
| 6,234,195 | B1 | * | 5/2001 | Kippe .................... B60K 15/04 137/493.3 |
| 7,077,461 | B2 | * | 7/2006 | Ratet ........................ 296/187.02 |
| 2005/0017542 | A1 | | 1/2005 | Belpaire |
| 2007/0012365 | A1 | * | 1/2007 | Kishi et al. ................... 137/527 |
| 2007/0056648 | A1 | * | 3/2007 | Benjey ................. F16K 15/144 137/855 |
| 2009/0078495 | A1 | | 3/2009 | Belpaire |
| 2011/0024933 | A1 | | 2/2011 | Monnet et al. |

FOREIGN PATENT DOCUMENTS

| CN | 101367357 | 2/2009 |
| JP | 61050533 | 3/1986 |
| JP | 63067296 | 3/1988 |
| JP | 2033726 U | 3/1990 |
| JP | 2001122051 A | 6/2001 |
| JP | 2001151153 A | 6/2001 |
| JP | 2001171442 A | 6/2001 |
| JP | 2005511404 A | 4/2005 |
| JP | 2001122051 A | 5/2011 |
| WO | 03051676 | 6/2003 |

OTHER PUBLICATIONS

Office Action issued on Feb. 13, 2015 in the corresponding Chinese patent Application No. 201280012107.7.
Japanese Office Action dated Jul. 1, 2014 and translation.
PCT JP2012/054127 International Search Report; May 22, 2012.
Office Action issued on Aug. 5, 2015 in corresponding Chinese Patent Application No. 201280012107.7 and partial translation thereof.

* cited by examiner

FOAMABLE FILLING DEVICE

CROSS-REFERENCE TO RELATED APPLICATIONS

This international application claims the benefit of Japanese Patent Application No. 2011-054653 filed Mar. 11, 2011 in the Japan Patent Office, and the entire disclosure of Japanese Patent Application No. 2011-054653 is incorporated herein by reference.

TECHNICAL FIELD

The present invention relates to a foamable filling device that includes a foamable material and is formed by causing the foamable material to be foamed and cured. Specifically, the present invention relates to a foamable filling device to be arranged within a hollow structural member such as a front pillar, a center pillar, and a roof side panel of a vehicle.

BACKGROUND ART

Conventionally, in a vehicle and the like provided with a sunroof, an inner insertion member such as a drain hose for draining rainwater guided to a periphery of the sunroof is, in some cases, inserted into a hollow structural member such as a front pillar.

On the other hand, in a case where a foamable filling device is arranged within the hollow structural member to seek vibration suppression and noise reduction, an interior region of the hollow structural member is occupied by the foamable filling device, and an insertion route for the inner insertion member may be blocked. In such a case, a through hole is provided in the foamable filling device so that the inner insertion member can be inserted into the hollow structural member.

For example, Patent Document 1 discloses a hollow chamber shut-off device including a holder to be mounted to a hollow chamber; and a foamable base material to be installed to the holder. The holder has a cylindrical body provided thereon including a through hole, into which an inner insertion member can be inserted. At an opening portion of the cylindrical body, a cover body is openably and closably provided by means of an openable/closable coupling portion. When the inner insertion member is not inserted into the through hole, the cover body is kept closed by engagement of a closing means, whereas when the inner insertion member is inserted into the through hole, the engagement of the closing means is released and the cover body is opened.

PRIOR ART DOCUMENTS

Patent Documents

Patent Document 1; Japanese Unexamined Patent Application Publication No. 2001-122051

SUMMARY OF THE INVENTION

Problems to be Solved by the Invention

When the hollow structural member is coated, fluid pressure by a coating material is applied to the cover body and, in some cases, the engagement of the closing means is thereby released. However, in the conventional invention as described in Patent Document 1, once the engagement of the closing means is released after the hollow chamber shut-off device is disposed within the hollow structural member, an insertion hole can no longer be closed. In such a case, even in a case where the inner insertion member such as a drain hose is not inserted into the insertion hole, the insertion hole is kept in an open state to thereby cause a problem that a shut-off property inside the hollow structural member is reduced.

It is desirable to provide a foamable filling device in which a shut-off property of a hollow structural member can be suitably maintained.

Means for Solving the Problems

The present invention relates to a foamable filling device that includes a foamable material and is disposed within a hollow structural member. The foamable filling device includes a carrier member and an opening/closing member. The carrier member includes a through hole and a mounting portion to which the foamable material is mounted. The opening/closing member includes a cover portion formed in a size capable of blocking the through hole and a biasing portion that biases the cover portion, and the opening/closing member is fittable to the carrier member. The opening/closing member is configured such that, when the opening/closing member is fitted to the carrier member, the biasing portion is elastically deformed and biases the cover portion to thereby bring the cover portion into contact with a seat portion provided at an end of the through hole of the carrier member.

In the foamable filling device of the present invention, the carrier member may include an engagement portion; the opening/closing member may include a fitting portion that is engaged with the engagement portion of the carrier member; and the biasing portion may be elastically deformed in such a state where the engagement portion and the fitting portion are engaged with each other.

In the foamable filling device of the present invention, the cover portion may be configured to be rotatable in a direction biased by the biasing portion and in an opposite direction to such a biased direction.

In the foamable filling device of the present invention, the carrier member may include a cylindrical portion that constitutes the through hole, and the seat portion may be formed on one end face of the cylindrical portion.

In the foamable filling device of the present invention, the fitting portion may be formed at an edge of the cover portion, and the biasing portion may extend from the fitting portion toward a direction opposite to the cover portion and is pressed against the carrier member to thereby be elastically deformed.

In the foamable filling device of the present invention, the biasing portion may be provided to stand from the cover portion and may include at a leading end thereof a sliding portion projecting from the biasing portion at both sides thereof; the carrier member may include a slit capable of receiving the leading end of the biasing portion while controlling insertion of the sliding portion; and the biasing portion may be elastically deformed in such a state where the leading end thereof is received by the slit, and may generate a biasing force that brings the cover portion into contact with the seat portion.

In the foamable filling device of the present invention, the fitting portion may be formed in a columnar shaft shape, and the engagement portion may include shaft bearing portions having grooves that rotatably support the fitting portion and claw portions that cause the fitting portion to be held in the shaft bearing portions.

In the foamable filling device of the present invention, the fitting portion may be formed in a columnar shaft shape, and the engagement portion may receive respective both ends of the fitting portion so that the fitting portion is rotatable.

In the foamable filling device of the present invention, the fitting portion may be formed in a cylindrical shape; the engagement portion may be formed in a shaft shape; and the engagement portion and the fitting portion may be engaged with each other so that the fitting portion is rotatable.

In the foamable filling device of the present invention, the biasing portion may be provided between the cover portion and the fitting portion.

Effects of the Invention

Since the foamable filling device of the present invention is configured such that the biasing portion is elastically deformed and biases the cover portion to thereby bring the cover portion into contact with the seat portion provided at the end of the through hole of the carrier member, a shut-off property of the hollow structural member can be suitably maintained.

In the foamable filling device of the present invention, since the cover portion is spaced apart from the seat portion by a fluid pressure of a process liquid such as a coating material to thereby allow passage of the process liquid, the process liquid can be suppressed from staying inside. Thus, the cover portion can be suppressed from adhering to the seat portion due to drying of the process liquid, or the like. Moreover, in a case where an inner insertion member is not inserted into the through hole, the cover portion sits on the seat portion and a shut-off property is thereby ensured, and in a case where the inner insertion member is inserted, the cover portion is spaced apart from the seat portion to thereby enable the inner insertion member to be arranged. Consequently, the foamable filling device of the present invention can be used regardless of whether the inner insertion member is to be inserted and, therefore, standardization of components can be sought.

According to the configuration in which the carrier member includes the cylindrical portion having the through hole, the through hole and the seat portion can be easily formed. Moreover, since the biasing portion extends from the fitting portion toward the direction opposite to the cover portion and is pressed against the carrier member to thereby be elastically deformed, it is possible to provide the biasing portion with a simple configuration. Furthermore, according to the configuration in which the biasing portion is provided to stand on the cover portion and includes the sliding portion, the carrier member can be made smaller.

Since the fitting portion is formed in a columnar shaft shape, and the engagement portion includes the shaft bearing portions having the grooves that rotatably support the fitting portion; and the claw portions that cause the fitting portion to be held in the shaft bearing portions, it is possible to cause the cover portion to reliably rotate. In the configuration in which the fitting portion is formed in a columnar shaft shape and the engagement portion receives respective both ends of the fitting portion so that the fitting portion is rotatable, too, it is possible to cause the cover portion to reliably rotate. Alternatively, the configuration may be adapted in which the fitting portion is formed in a cylindrical shape; in which the engagement portion is formed in a shaft shape; and in which the engagement portion and the fitting portion are engaged with each other so that the fitting portion is rotatable. In such a case, too, it is possible to cause the cover portion to reliably rotate. In addition, according to the configuration in which the biasing portion is provided between the cover portion and the fitting portion, a simpler structure can be achieved.

Figure 1:
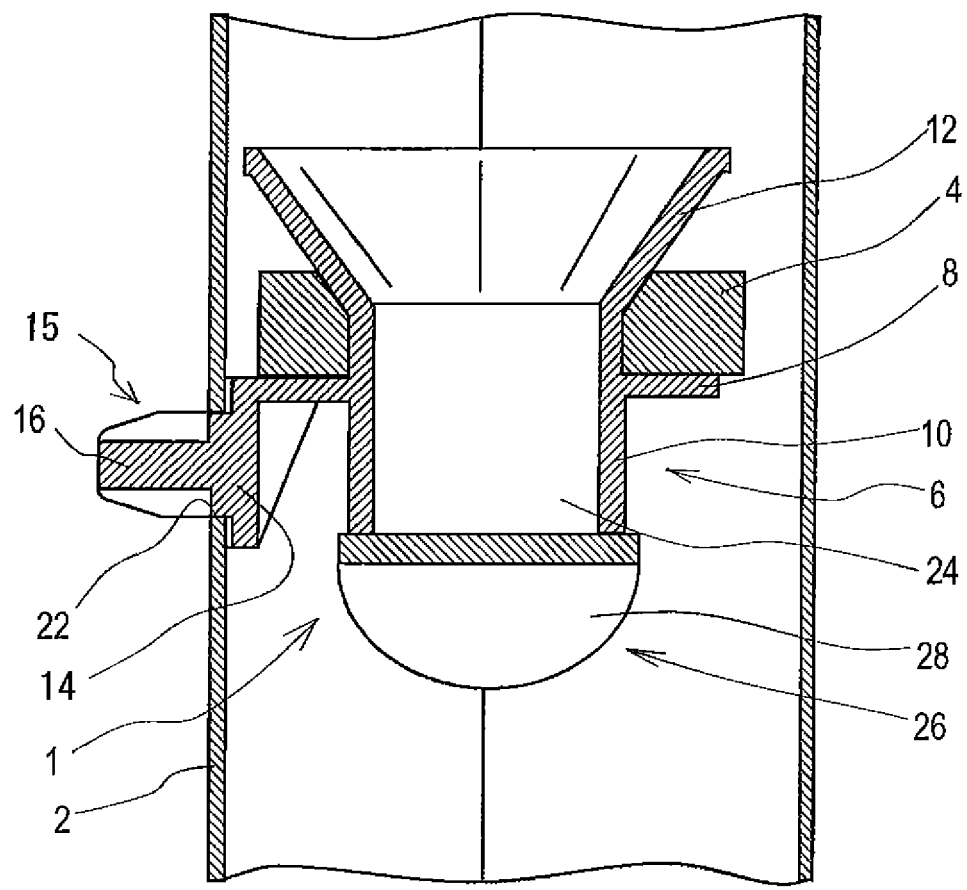
FIG. 1 is a cross-sectional view showing a state in which a foamable filling device as a first embodiment of the present invention is mounted to a hollow structural member.

EXPLANATION OF REFERENCE NUMERALS 1, 51, 61, 71, 81, 101 . . . foamable filling device, 2 . . . hollow structural member, 4 . . . foamable material, 6, 91 . . . carrier member, 8, 8a, 8b . . . flat plate portion, 10 . . . cylindrical portion, 12, 92 . . . tapered portion, 14 . . . base plate portion, 15 . . . clip portion, 22 . . . mounting hole, 24 . . . through hole, 26, 26a, 82, 102 . . . opening/closing member, 28, 83 . . . cover portion, 30 . . . seat portion, 32, 32a, 106 . . . fitting portion, 34, 84, 104 . . . biasing portion, 36, 52, 54, 62a, 62b, 64a, 64b, 74, 108 . . . engagement portion, 38, 40 . . . groove, 42, 44 . . . shaft bearing portion, 46, 48 . . . claw portion, 50 . . . drain hose, 86 . . . sliding portion, 94 . . . slit

MODE FOR CARRYING OUT THE INVENTION

Hereinafter, a mode for carrying out the present invention will be described in detail with reference to the drawings.

In FIG. 1, a foamable filling device 1 is disposed within a hollow structural member 2 such as a front pillar of a vehicle. The hollow structural member 2 is configured, for example, by welding an inner pillar and an outer pillar while respective flanges thereof face each other. An inside of the hollow structural member 2 is formed in a hollow shape.

The foamable filling device 1 includes a foamable material 4 that is foamed and cured by heat and a carrier member 6 to which the foamable material 4 is mounted. The foamable material 4 is formed by compounding an appropriately selected foaming agent and curing agent with a resin-based material or a rubber material including a thermoplastic elastomer, or a mixed material thereof, and further compounding other materials as necessary. The foamable material 4 is a foamable material that is foamed and cured at a temperature of around 110° C.-190° C. The foamable material 4 is mounted to the carrier member 6 in an unfoamed state.

The carrier member 6 includes a flat plate portion 8 provided across the inside of the hollow structural member 2 perpendicularly to a longitudinal direction of the hollow structural member 2. The carrier member 6 further includes a cylindrical portion 10. The cylindrical portion 10 is provided so as to penetrate the flat plate portion 8 perpendicularly to the flat plate portion 8. At one end of the cylindrical portion 10, a tapered portion 12 of a tapered shape is provided. An opening diameter of the tapered portion 12 becomes gradually greater outwardly from the one end of the cylindrical portion 10. The tapered portion 12 is formed integrally with the cylindrical portion 10. The tapered portion 12 may be formed as a component independent of the cylindrical portion 10. Here, the foamable material 4 is disposed between an outer wall of the tapered portion 12 and the flat plate portion 8.

On a part of an outer peripheral edge of the flat plate portion 8, a base plate portion 14 is formed which can face an inner wall of the hollow structural member 2. The base plate portion 14 is formed integrally with the flat plate portion 8. The base plate portion 14 has a clip portion 15 provided thereon. The clip portion 15 includes a leg portion 16 provided to stand from the base plate portion 14 and elastic piece portions 18, 20 (see FIG. 2). The elastic piece portions 18, 20 are mounted to the leg portion 16 in such a manner that a space (distance) between the elastic piece portions 18, 20 gradually becomes greater from a leading end portion of the leg portion 16 (an end portion opposite to the base plate portion 14) toward the base plate portion 14.

The hollow structural member 2 has a mounting hole 22 of a rectangular shape formed therein. As the clip portion 15 is inserted through the mounting hole 22, the elastic piece portions 18, 20 are closed so as to come closer to each other, and the elastic piece portions 18, 20 can pass through the mounting hole 22. When the elastic piece portions 18, 20 have passed through the mounting hole 22, the elastic piece portions 18, 20 are opened, and the clip portion 15 is engaged with the mounting hole 22 so that the clip portion 15 does not fall off from the mounting hole 22.

Figure 2:
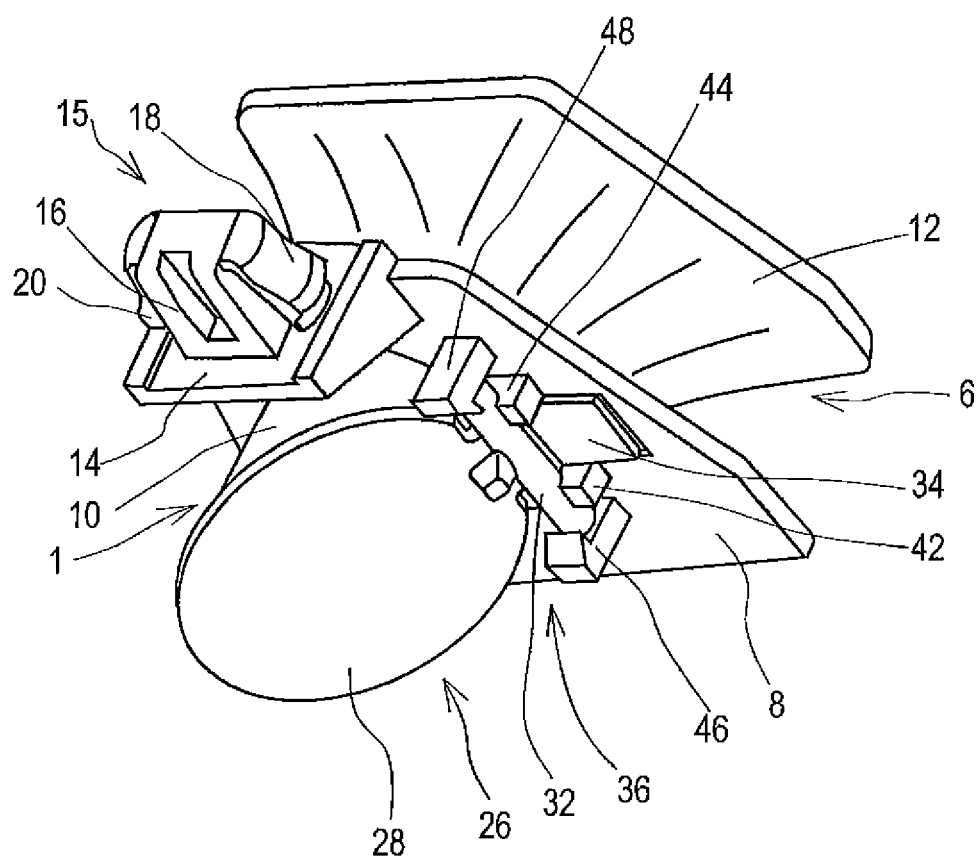
FIG. 2 is a perspective view showing a state in which an opening/closing member is mounted to a carrier member of the first embodiment.
Figure 3:
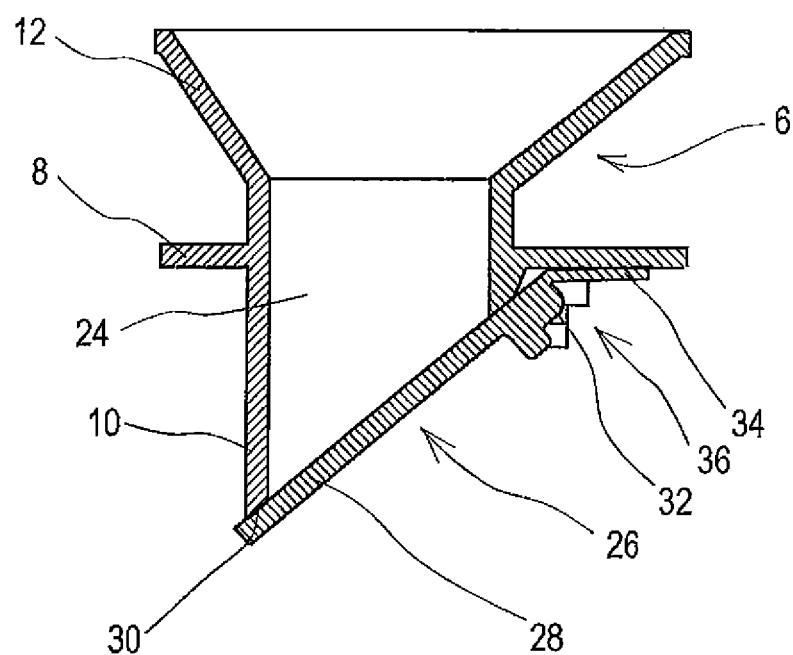
FIG. 3 is a cross-sectional view showing the state in which the opening/closing member is mounted to the carrier member of the first embodiment.

In this first embodiment, a through hole 24 is formed by the cylindrical portion 10, and at other end of the cylindrical portion 10 (an end on an opposite side of the tapered portion 12), an opening/closing member 26 is provided. The opening/closing member 26 includes a cover portion 28 having a size that blocks the through hole 24. As shown in FIG. 2 and FIG. 3, the other end of the cylindrical portion 10 is formed, as a whole, diagonally to an axial direction of the cylindrical portion 10. Hereinafter, an entire end face of the other end of the cylindrical portion 10 is referred to as a seat portion 30. The cover portion 28 can block the through hole 24 more completely by contacting the seat portion 30 of the cylindrical portion 10.

Figure 5:
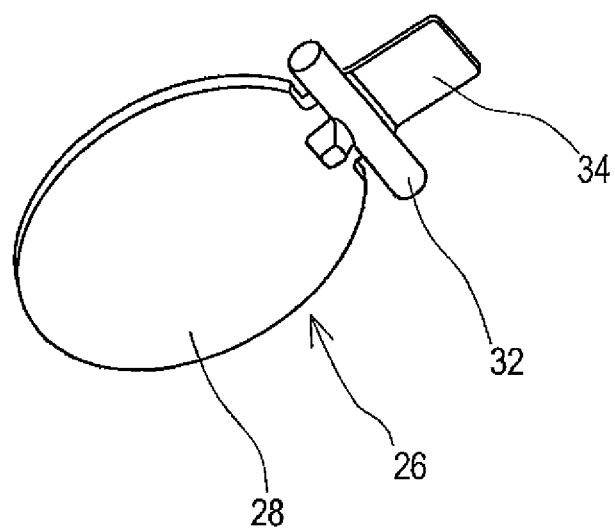
FIG. 5 is a perspective view of the opening/closing member of the first embodiment.

As shown in FIG. 5, the opening/closing member 26 includes a fitting portion 32 of a columnar shaft shape. The fitting portion 32 is formed integrally with the cover portion 28 at a part of an outer edge of the cover portion 28. An axial direction of the fitting portion 32 is parallel to the cover portion 28 of a flat plate shape (thus, an imaginary line extending from an axis of the fitting portion 32 never intersects the cover portion 28). A biasing portion 34 of a flat plate shape extends from the fitting portion 32 toward an opposite side of the cover portion 28. The biasing portion 34 is elastically deformable. In the first embodiment, the biasing portion 34 is formed approximately parallel to the cover portion 28 of a flat plate shape or at a predetermined angle with respect to the cover portion 28. A width of the biasing portion 34 (a dimension in an axial direction of the fitting portion 32) is smaller than a length (a longitudinal length) of the fitting portion 32. In other words, the fitting portion 32 is formed so as to protrude from the biasing portion 34 at both sides thereof.

Figure 4:
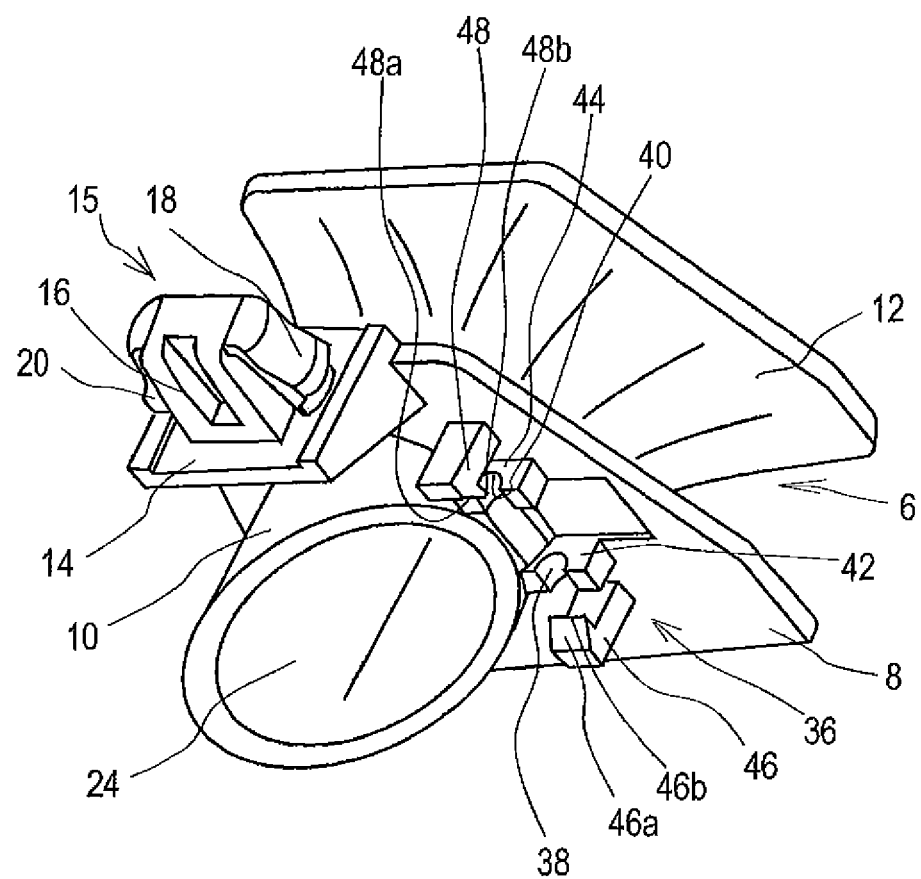
FIG. 4 is a perspective view of the carrier member of the first embodiment.

The flat plate portion 8 of the carrier member 6 has an engagement portion 36 provided thereon which is engageable with the fitting portion 32 of the opening/closing member 26. As shown in FIG. 4, the engagement portion 36 includes a pair of shaft bearing portions 42, 44 respectively having grooves 38, 40 formed therein of a semicircular shape corresponding to an outer shape of the fitting portion 32. The shaft bearing portions 42, 44 are disposed at an interval shorter (narrower) than an axial length of the fitting portion 32 and also at an interval wider than the width of the biasing portion 34. Specifically, the grooves 38, 40 are formed so as to be able to receive respective both end sides of the fitting portion 32.

The engagement portion 36 includes a pair of claw portions 46, 48 provided on axial outsides of the shaft bearing portions 42, 44, respectively. In a state where the fitting portion 32 is engaged with the grooves 38, 40, the claw portions 46, 48 are positioned on an axial extension of the fitting portion 32 and face both end faces of the fitting portion 32.

When the opening/closing member 26 is being fitted to the carrier member 6 (when the fitting portion 32 is being engaged with the grooves 38, 40 of the respective shaft bearing portions 42, 44), both axial ends of the fitting portion 32 come into contact with slanting portions 46a, 48a of the respective claw portions 46, 48, and the claw portions 46, 48 are elastically deformed outwardly. When the fitting portion 32 is completely engaged with the grooves 38, 40, such elastic deformation of the claw portions 46, 48 is recovered and convex portions 46b, 48b of the respective claw portions 46, 48 protrude toward a side of the fitting portion 32. Thus, the fitting portion 32 is held in the grooves 38, 40 so as not to fall off from the grooves 38, 40.

When the fitting portion 32 and the engagement portion 36 are engaged with each other, the biasing portion 34 comes into contact with the flat plate portion 8 and is elastically deformed. Biasing force generated by such elastic deformation causes the fitting portion 32 to rotate about an axis thereof, and brings the cover portion 28 into contact with the seat portion 30 of the cylindrical portion 10.

Next, a description will be given of operation of the foamable filling device 1 of the first embodiment. First, the fitting portion 32 of the opening/closing member 26 is brought into contact with the slanting portions 46a, 48a (see FIG. 4), and the claw portions 46, 48 are elastically deformed outwardly to thereby cause the fitting portion 32 to engage with the grooves 38, 40 (see FIG. 4) of the respective shaft bearing portions 42, 44. When such deformation of the claw portions 46, 48 is recovered, the convex portions 46b, 48b protrude toward the side of the fitting portion 32 to thereby hold the fitting portion 32 in the grooves 38, 40.

When the fitting portion 32 is caused to be engaged with the grooves 38, 40, such engagement is achieved in such a state where the biasing portion 34 is elastically deformed. The biasing force generated by such elastic deformation causes the fitting portion 32 to rotate about the axis of the fitting portion 32, and brings the cover portion 28 into contact with the seat portion 30 of the cylindrical portion 10 to thereby block the cylindrical portion 10 (an opening of the through hole 24).

As shown in FIG. 1, the foamable material 4 is mounted to the carrier member 6, and the clip portion 15 is inserted through the mounting hole 22 of the hollow structural member 2. As the clip portion 15 is inserted through the mounting hole 22, the elastic piece portions 18, 20 are closed so as to come closer to each other, and the elastic piece portions 18, 20 can pass through the mounting hole 22. When the elastic piece portions 18, 20 have passed through the mounting hole 22, the elastic piece portions 18, 20 are opened, and the clip portion 15 is engaged with the mounting hole 22 so that the clip portion 15 does not fall off from the mounting hole 22.

A description will be given of mounting of the foamable filling device 1 to the hollow structural member 2. For example, before the inner pillar and the outer pillar are caused to face each other and welded to each other, the foamable filling device 1 is first mounted to one of the pillars. Then, the inner pillar and the outer pillar are caused to face each other and welded to each other. To the hollow structural member 2, a coating is applied, for example, and at this time, a coating material as a process liquid also enters an inside of the hollow structural member 2. The coating material also enters the cylindrical portion 10 from the tapered portion 12, and a fluid pressure by the coating material acts on the cover portion 28 of the opening/closing member 26.

The fluid pressure acting on the cover portion 28 causes the fitting portion 32 to rotate about the axis of the fitting portion 32, and the cover portion 28 is spaced apart from the seat portion 30. Due to this, the coating material flows out from an inside of the cylindrical portion 10 into the hollow structural member 2 by way of the seat portion 30 (an outlet of the through hole 24). As a result, the coating material is suppressed from collecting within the cylindrical portion 10 and at an inner side of the cover portion 28. Eventually, the cover portion 28 can be suppressed from adhering to the seat portion 30 when the coating material is dry.

When the coating material is being dried, the foamable material 4 is foamed to fill the inside of the hollow structural member 2, and a shut-off property is thereby ensured. Moreover, due to the biasing force of the biasing portion 34, the cover portion 28 comes into contact with the seat portion 30 of the cylindrical portion 10 to thereby block the cylindrical portion 10 (the outlet of the through hole 24). As a result, a shut-off property is ensured.

Then, when a drain hose 50 as an insertion member is inserted into the hollow structural member 2 and a leading end of the drain hose 50 reaches the tapered portion 12, the drain hose 50 is guided to the through hole 24 along the tapered portion 12.

Figure 6:
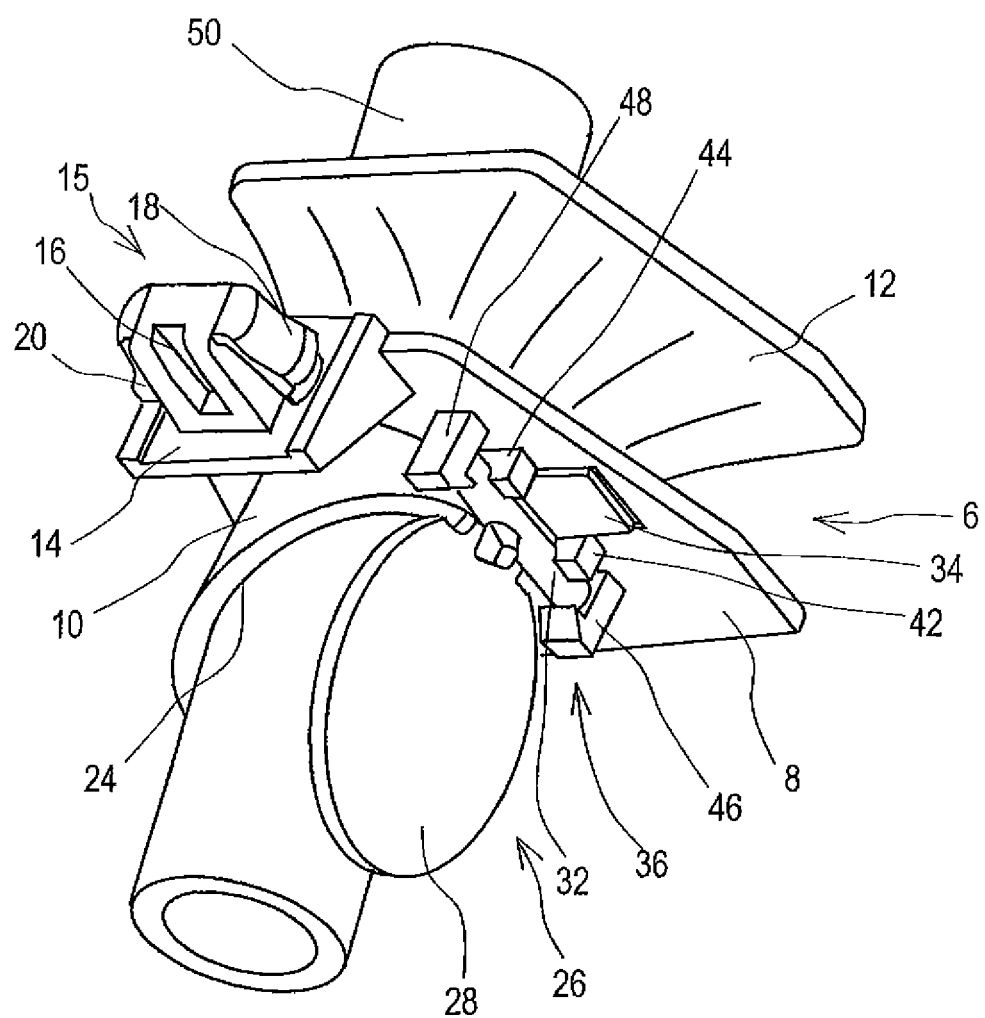
FIG. 6 is a perspective view showing a state in which an insertion member is inserted into the carrier member of the first embodiment.

When the leading end of the drain hose 50 is guided from the tapered portion 12 into the cylindrical portion 10, the drain hose 50 proceeds through the through hole 24, and the leading end of the drain hose 50 hits the cover portion 28. When the drain hose 50 is further thrusted in against the biasing by the biasing portion 34, the cover portion 28 is pushed by the leading end of the drain hose 50 to thereby rotate the fitting portion 32, and the cover portion 28 is spaced apart from the seat portion 30. Then, as shown in FIG. 6, the drain hose 50 is guided out to an outside of the through hole 24.

As described above, according to the foamable filling device 1 of the first embodiment, even when the coating material as a process liquid flows into the hollow structural member 2 to which the foamable filling device 1 is mounted, the cover portion 28 is caused to be spaced apart from the seat portion 30 by the fluid pressure of the coating material against the biasing force of the biasing portion 34, and the coating material is caused to pass through. Therefore, the coating material is suppressed from staying within the cylindrical portion 10. Eventually, the cover portion 28 can be suppressed from adhering to the seat portion 30 when the coating material is dry. In a case where the drain hose 50 is not inserted, the cover portion 28 sits on the seat portion 30, and a shut-off property is thereby ensured.

On the other hand, in a case where the drain hose 50 as an insertion member is inserted, the leading end of the drain hose 50 pushes the cover portion 28, and the cover portion 28 is spaced apart from the seat portion 30. Then, the drain hose 50 passes through the seat portion 30 (the outlet of the through hole 24) and is guided out to the outside of the through hole 24. Consequently, whether in the case where the drain hose 50 is inserted or whether in the case where the drain hose 50 is not inserted, the same foamable filling device 1 can be used and, therefore, standardization of components can be sought.

Figure 7:
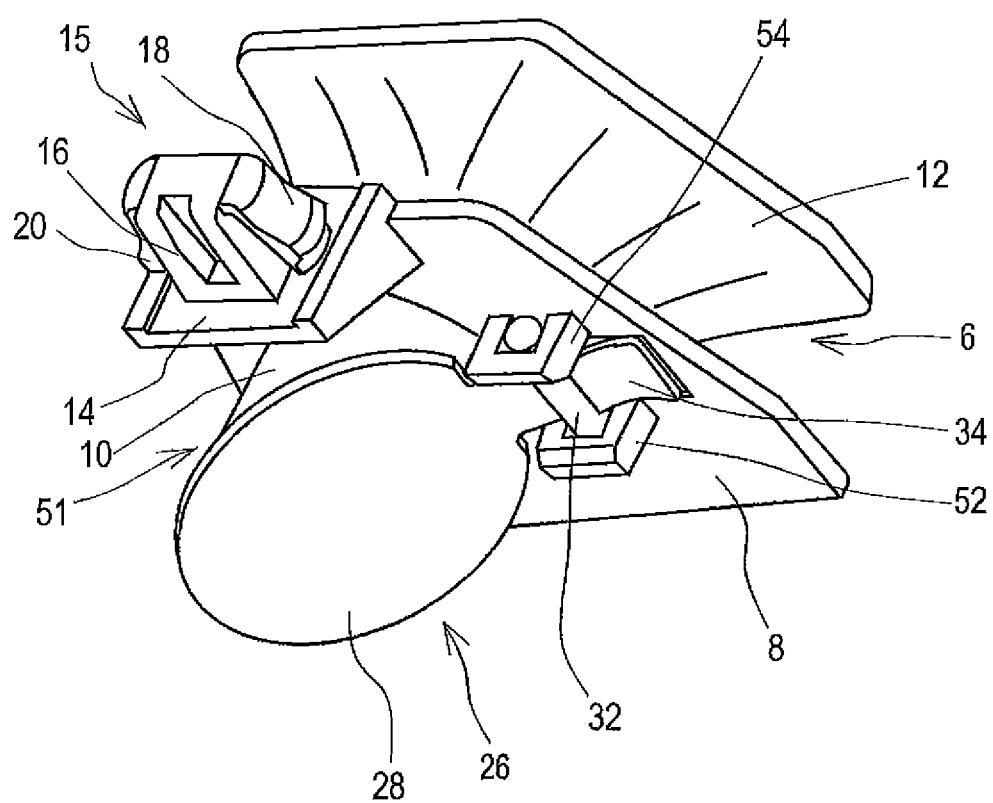
FIG. 7 is a perspective view showing a state in which an opening/closing member is mounted to a carrier member of a second embodiment.

Next, a description will be given of a second embodiment, which is different from the above-described first embodiment, with reference to FIG. 7. It is to be noted that, as for the same components as those in the above-described first embodiment, the same numbers are assigned to and detailed description will be omitted.

Compared to the foamable filling device 1 of the first embodiment, a foamable filling device 51 of the second embodiment is different in the configuration of the engagement portion 36. The foamable filling device 51 of the second embodiment includes a pair of engagement portions 52, 54. The engagement portions 52, 54 are disposed facing each other at an interval shorter (narrower) than the axial length of the fitting portion 32 and also at an interval wider than the width of the biasing portion 34. The both ends of the fitting portion 32 can be respectively inserted into the engagement portions 52, 54, and the fitting portion 32 is thereby rotatably supported by the engagement portions 52, 54.

Figure 8:
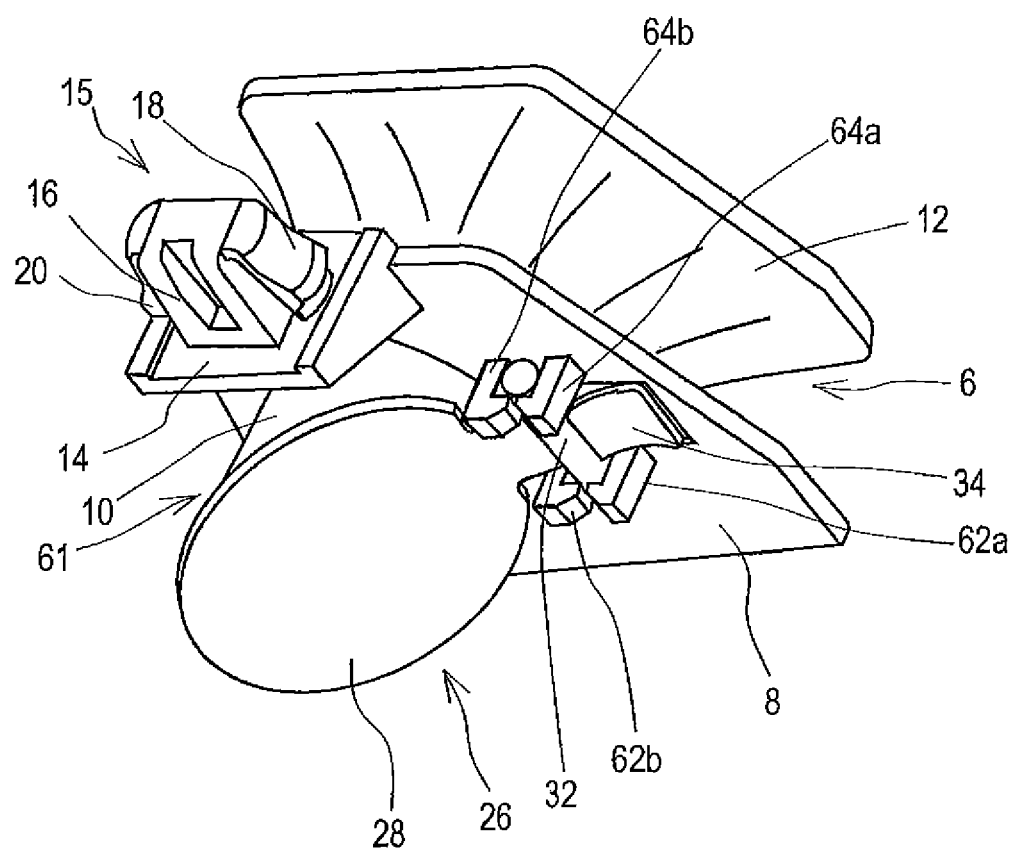
FIG. 8 is a perspective view showing a state in which an opening/closing member is mounted to a carrier member of a third embodiment.

Subsequently, a description will be given of a foamable filling device 61 of a third embodiment with reference to FIG. 8. As shown in FIG. 8, the foamable filling device 61 of the third embodiment includes engagement portions 62a, 62b, 64a, 64b of an L shape. The engagement portions 62a, 62b and 64a, 64b have such a shape (configuration) that the above-described engagement portions 52, 54, respectively, are centrally divided. An interval between one pair of the engagement portions 62a, 62b and other pair of the engagement portions 64a, 64b is shorter (narrower) than the axial length of the fitting portion 32 and also wider than the width of the biasing portion 34. The both ends of the fitting portion 32 are respectively inserted into the one pair of the engagement portions 62a, 62b and the other pair of the engagement portions 64a, 64b. The fitting portion 32 is rotatably supported by the engagement portions 62a, 62b, 64a, 64b.

Figure 9:
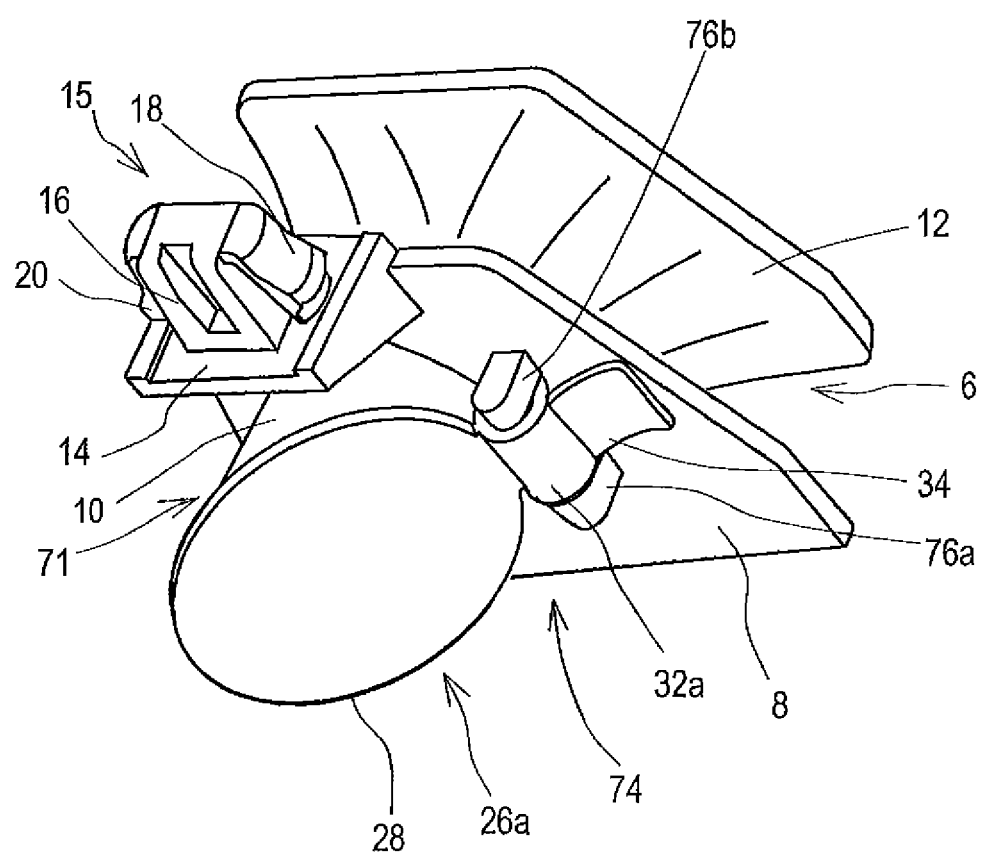
FIG. 9 is a perspective view showing a state in which an opening/closing member is mounted to a carrier member of a fourth embodiment.
Figure 10:
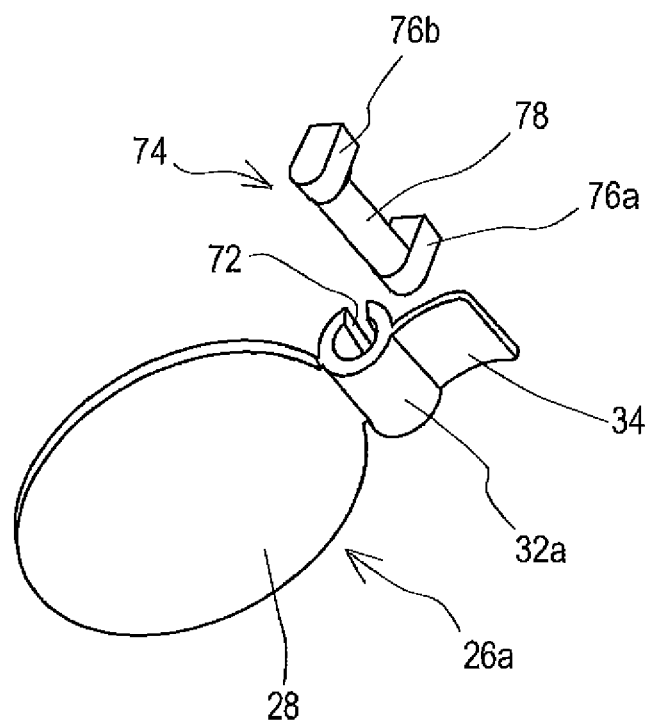
FIG. 10 is a perspective view of the opening/closing member of the fourth embodiment.

Next, a description will be given of a foamable filling device 71 of a fourth embodiment with reference to FIG. 9 and FIG. 10. Compared to the foamable filling device 1 of the first embodiment, the foamable filling device 71 of the fourth embodiment is different in the configuration of the fitting portion 32 and the engagement portion 36. As shown in FIG. 10, in the foamable filling device 71 of the fourth embodiment, a fitting portion 32a of an opening/closing member 26a is formed in a cylindrical shape. Part of the fitting portion 32a is cut out in an axial direction thereof to form a slit 72.

An engagement portion 74 of the fourth embodiment includes a pair of pillar portions 76a, 76b provided to stand on the flat plate portion 8 so as to be able to be positioned on both sides of the fitting portion 32a. Between the pillar portions 76a, 76b, a shaft portion 78 of a columnar shape is put across. The shaft portion 78 passes through the slit 72 and is engaged with the fitting portion 32a of a cylindrical shape, and the fitting portion 32a is thereby rotatably supported by the engagement portion 74.

Similarly to the foamable filling device 1 of the first embodiment, in the above-described foamable filling devices 51, 61, 71 of the second to fourth embodiments, too, even when the coating material as a process liquid flows in, the cover portion 28 is spaced apart from the seat portion 30 by the fluid pressure of the coating material against the biasing force of the biasing portion 34, and the coating material passes through the seat portion 30 (the outlet of the through hole 24). Accordingly, the cover portion 28 can be suppressed from adhering to the seat portion 30 due to drying of the coating material, or the like.

In a case where the drain hose 50 is not inserted, the cover portion 28 sits on the seat portion 30, and a shut-off property is thereby ensured. Whether in the case where the drain hose 50 is inserted or whether in the case where the drain hose 50 is not inserted, the same foamable filling devices 51, 61, 71 can be used, and standardization of components can be sought.

Figure 11:
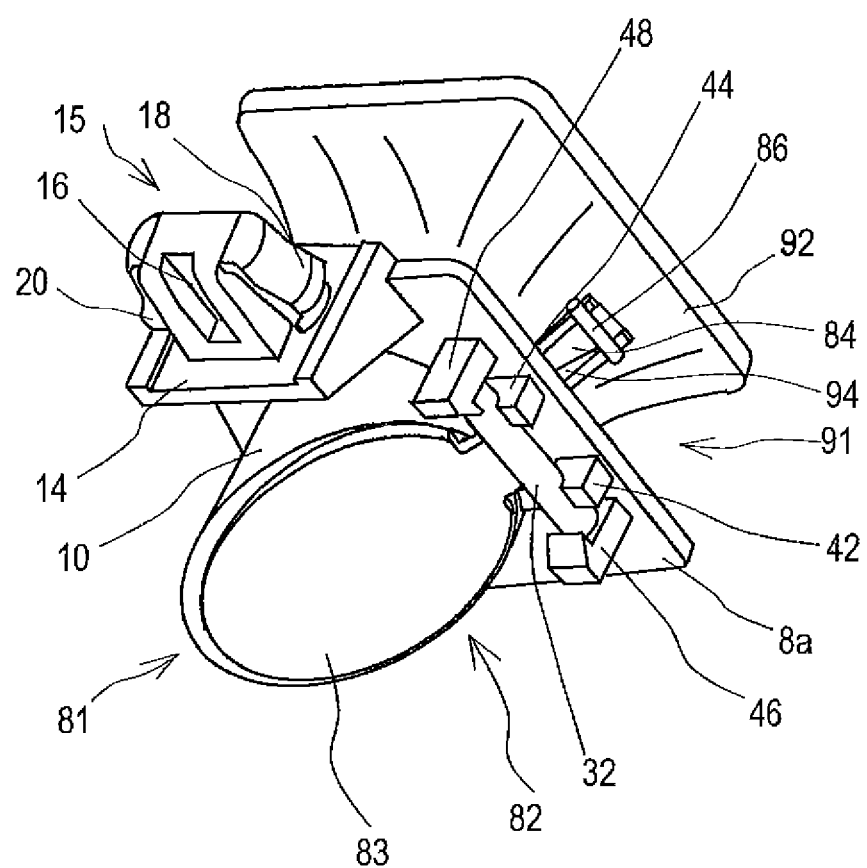
FIG. 11 is a perspective view showing a state in which an opening/closing member is mounted to a carrier member of a fifth embodiment.

Next, a description will be given of a fifth embodiment, which is different from the above-described first to fourth embodiments, with reference to FIG. 11 to FIG. 13.

Compared to the foamable filling device 1 of the first embodiment, a foamable filling device 81 of the fifth embodiment is different in the configuration of the biasing portion 34. As shown in FIG. 13, an opening/closing member 82 of the foamable filling device 81 of the fifth embodiment has a configuration in which the fitting portion 32 is attached to a cover portion 83. The cover portion 83 has a biasing portion 84 provided to stand thereon. The biasing portion 84 is formed in an elongated plate shape. On a leading end of the biasing portion 84, a sliding portion 86 of a columnar shape is provided. The sliding portion 86 is formed longer than a width of the biasing portion 84, and is provided in a protruding manner in a width direction of the biasing portion 84. An axial direction of the sliding portion 86 is parallel to the fitting portion 32.

A carrier member 91 includes the flat plate portion 8a and the cylindrical portion 10. At one end of the cylindrical portion 10, a tapered portion 92 of a tapered shape is provided. An opening diameter of the tapered portion 92 becomes gradually greater outwardly from the one end of the cylindrical portion 10. The tapered portion 92 is formed integrally with the cylindrical portion 10. The tapered portion 92 may be formed as a component independent of the cylindrical portion 10. On a part of an outer peripheral edge of the flat plate portion 8a, the base plate portion 14 is provided. The base plate portion 14 has the clip portion 15 provided thereon.

The tapered portion 92 has a slit 94 formed therein through which the biasing portion 84 can be inserted. A configuration is employed in which the sliding portion 86 is in contact with both edges of the slit 94 so that the biasing portion 84 inserted through the slit 94 does not come off from the slit 94 and in which the sliding portion 86 can slide along the both edges of the slit 94.

The flat plate portion 8a has the engagement portion 36 (see FIG. 12) provided thereon, which can be engaged with the fitting portion 32 of the opening/closing member 82. Similarly to the first embodiment, the engagement portion 36 includes a pair of the shaft bearing portions 42, 44 (see FIG. 11) and a pair of the claw portions 46, 48 (see FIG. 11).

Figure 12:
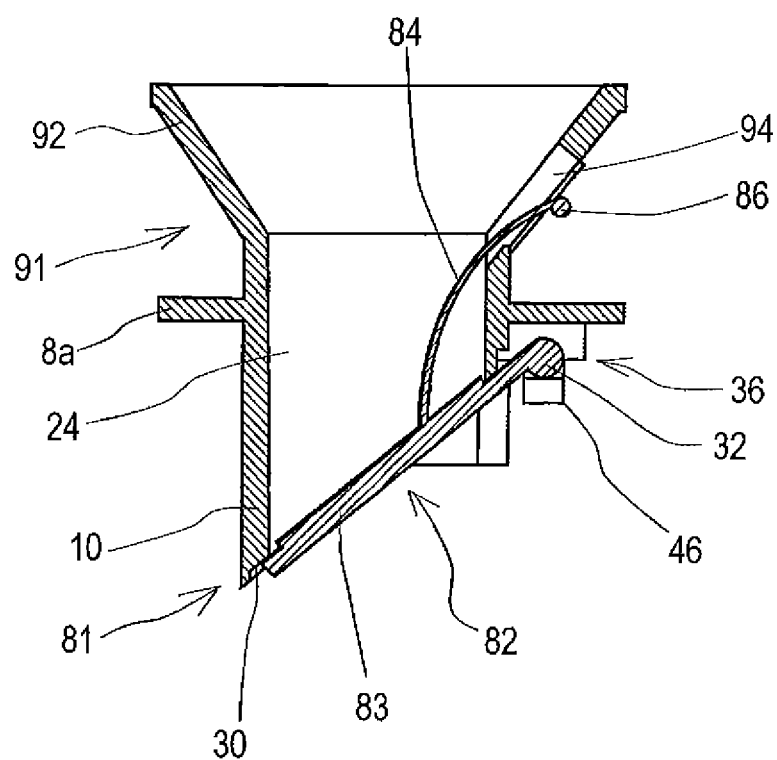
FIG. 12 is a cross-sectional view showing the state in which the opening/closing member is mounted to the carrier member of the fifth embodiment.
Figure 13:
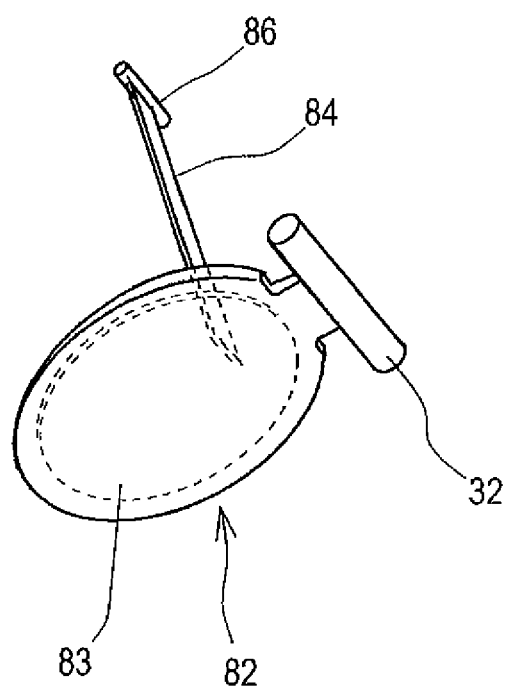
FIG. 13 is a perspective view of the opening/closing member of the fifth embodiment.

Shapes and positions of the biasing portion 84 and the slit 94 are determined such that, when the fitting portion 32 is engaged with the engagement portion 36, the biasing portion 84 is elastically deformed to thereby bias the cover portion 83 as shown in FIG. 12 (actually, the cover portion 83 is pulled upward in the drawing, but a term "bias" is used here). Specifically, a configuration is employed in which the fitting portion 32 is rotated about an axis thereof by a biasing force to thereby cause the cover portion 83 to sit on the seat portion 30.

Similarly to the above-described first embodiment, the fitting portion 32 of the opening/closing member 82 is caused to be engaged with the engagement portion 36 and the opening/closing member 82 is thereby fitted to the carrier member 91. When the fitting portion 32 is engaged with the engagement portion 36, such engagement is achieved in such a state where the biasing portion 84 is elastically deformed. The biasing force generated by such elastic deformation causes the fitting portion 32 to rotate about the axis of the fitting portion 32, and brings the cover portion 83 into contact with the seat portion 30 of the cylindrical portion 10 to thereby block the cylindrical portion 10 (the opening of the through hole 24). The foamable material 4 is mounted to the carrier member 91, and the clip portion 15 is inserted through the mounting hole 22 of the hollow structural member 2.

Similarly to the foamable filling device 1 of the first embodiment, in the case of the foamable filling device 81 of the fifth embodiment, too, even when the coating material as a process liquid flows into the hollow structural member 2 to which the foamable filling device 81 is mounted, the cover portion 83 is spaced apart from the seat portion 30 by the fluid pressure of the coating material against the biasing force of the biasing portion 84, and the coating material can pass through the seat portion 30 (the outlet of the through hole 24). Accordingly, the coating material is suppressed from staying within the cylindrical portion 10. Eventually, the cover portion 83 is suppressed from adhering to the seat portion 30 due to drying of the coating material, or the like. In a case where the drain hose 50 is not inserted, the cover portion 83 sits on the seat portion 30, and a shut-off property is thereby ensured.

On the other hand, in a case where the drain hose 50 as an insertion member is inserted, the leading end of the drain hose 50 pushes the cover portion 83, and the cover portion 83 is spaced apart from the seat portion 30. Then, the drain hose 50 passes through the seat portion 30 (the outlet of the through hole 24) and is guided out to the outside of the through hole 24. Consequently, whether in the case where the drain hose 50 is inserted or whether in the case where the drain hose 50 is not inserted, the same foamable filling device 81 can be used and, therefore, standardization of components can be sought.

Moreover, in the foamable filling device 81 of the fifth embodiment, since the biasing portion 84 is provided on the cover portion 83 and the biasing portion 84 is disposed within the cylindrical portion 10, the flat plate portion 8a can be formed smaller compared to the flat plate portion 8 of the first embodiment. Thus, it is possible to downsize the entire foamable filling device 81. As a result, even in a case where a cross-sectional area of the hollow structural member 2 is comparatively small, the foamable filling device 81 can be disposed therein. It is to be noted that, in the foamable filling device 81 of the fifth embodiment, the configuration of the fitting portion 32, 32a and the engagement portions 52, 54, 62a, 62b, 64a, 64b, 74 of the above-described second to fourth embodiments may be applied instead of the configuration of the fitting portion 32 and the engagement portion 36 of the fifth embodiment.

Figure 14:
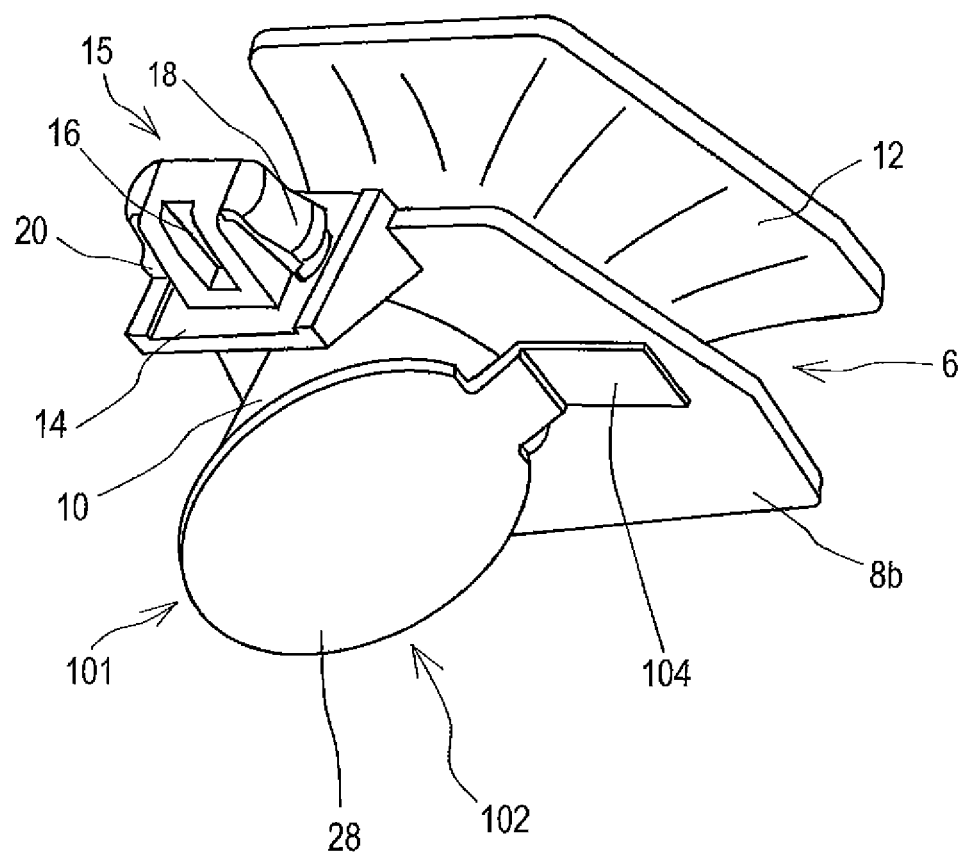
FIG. 14 is a perspective view showing a state in which an opening/closing member is mounted to a carrier member of a sixth embodiment.
Figure 15:
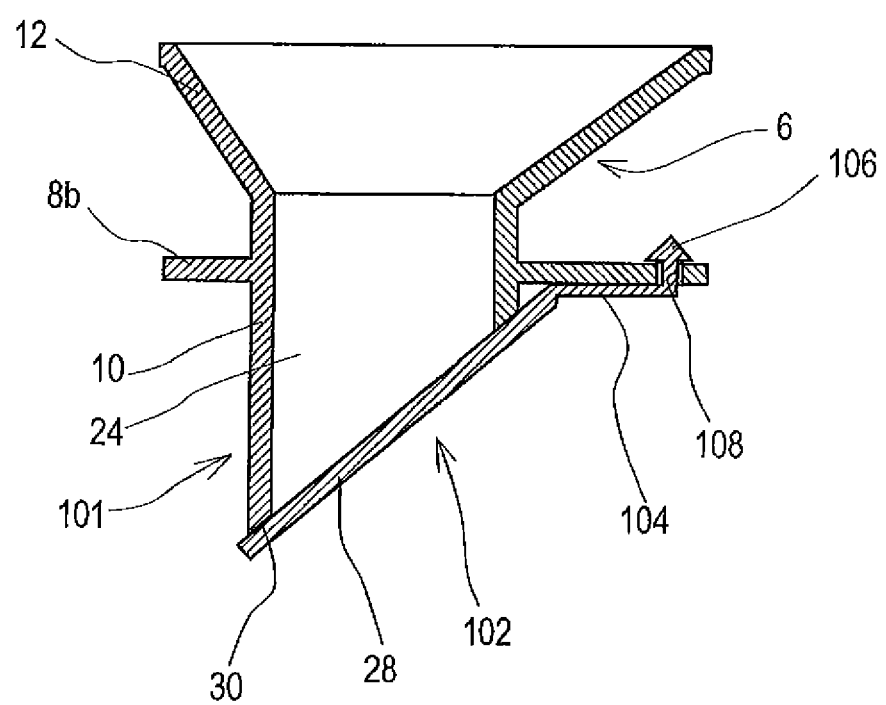
FIG. 15 is a cross-sectional view showing the state in which the opening/closing member is mounted to the carrier member of the sixth embodiment.

Next, a description will be given of a sixth embodiment, which is different from the above-described embodiments, with reference to FIG. 14 and FIG. 15. In a foamable filling device 101 of the sixth embodiment, a biasing portion 104 of a flat plate shape, which is elastically deformable, extends directly from the cover portion 28 of an opening/closing member 102. At one end of the biasing portion 104, a fitting portion 106 of an arrow shape is formed that can be engaged with the flat plate portion 8b (see FIG. 15). The flat plate portion 8b has an engagement portion 108 formed therein through which the fitting portion 106 can be inserted (see FIG. 15).

The engagement portion 108 of the sixth embodiment is configured as an engagement hole penetratingly formed in the flat plate portion 8b. By inserting the fitting portion 106 into the engagement portion 108, the engagement portion 108 and the fitting portion 106 are engaged with each other, and one end (a leading end) of the biasing portion 104 is fixed to the flat plate portion 8b. At the same time, the biasing portion 104 on a side of the cover portion 28 is elastically deformed, and the cover portion 28 is biased by a biasing force generated as a result of such elastic deformation such that the cover portion 28 comes into contact with the seat portion 30.

Similarly to the foamable filling device 1 of the first embodiment, in the case of the foamable filling device 101 of the sixth embodiment, too, even when the coating material flows into the hollow structural member 2 to which the foamable filling device 101 is mounted, the cover portion 28 is spaced apart from the seat portion 30 by the fluid pressure of the coating material against biasing of the biasing portion 104, and the coating material can pass through the outlet of the through hole 24. Accordingly, the coating material is suppressed from staying within the cylindrical portion 10. Eventually, the cover portion 28 is suppressed from adhering to the seat portion 30 due to drying of the coating material, or the like. In a case where the drain hose 50 is not inserted, the cover portion 28 sits on the seat portion 30, and a shut-off property is thereby ensured.

On the other hand, in a case where the drain hose 50 is inserted, the leading end of the drain hose 50 pushes the cover portion 28, and the cover portion 28 is spaced apart from the seat portion 30. Then, the drain hose 50 passes through the seat portion 30 (the outlet of the through hole 24) and is guided out to an opposite side in the foamable filling device 101. Consequently, whether in the case where the drain hose 50 is inserted or whether in the case where the drain hose 50 is not inserted, the same foamable filling device 101 can be used and, therefore, standardization of components can be sought. In addition, the foamable filling device 101 of the sixth embodiment is simpler in configuration.

The present invention is not to be limited to the above-described embodiments, and can be practiced in various manners within the scope not departing from the spirit of the present invention.

The invention claimed is:

1. A filling device, comprising
a foamed material that is foamed and cured by heat;
a carrier member including:
a mounting portion to which the foamed material is mounted, and a through hole; and
an opening/closing member including a cover portion blocking the through hole, and a biasing portion that biases the cover portion in a direction blocking the through hole, the opening/closing member being fitted to the carrier member;
wherein the filling device is configured to be disposed within a hollow structural member for a vehicle,
wherein the opening/closing member is configured such that, when the opening/closing member is fitted to the carrier member, the biasing portion is elastically deformed and biases the cover portion to thereby bring the cover portion into contact with a seat portion provided at an end of the through hole of the carrier member,
wherein the biasing portion is provided to stand from the cover portion, and includes at a leading end thereof a sliding portion projecting from the biasing portion at both sides thereof,
wherein the carrier member includes a slit through which the biasing portion is inserted, the slit contacting the sliding portion of the inserted biasing portion to help prevent the biasing portion from coming off, and
wherein a portion of the biasing portion connected to the cover portion is positioned on a through hole side of the cover portion, the biasing portion being elastically deformed in a state of extending from the through hole side to the slit to be inserted through the slit, and generates a biasing force that brings the cover portion into contact with the seat portion.

2. The filling device according to claim 1,
wherein the cover portion is configured to be rotatable in a direction biased by the biasing portion and in an opposite direction to such a biased direction.

3. The filling device according to claim 1,
wherein the carrier member comprises a cylindrical portion forming the through hole, and a flat plate portion provided such that the cylindrical portion is provided so as to penetrate the flat plate portion perpendicularly to the flat plate portion,
wherein the flat plate portion includes an engagement portion,
wherein the opening/closing member includes a fitting portion that is engaged with the engagement portion of the flat plate portion, and
wherein the biasing portion is elastically deformed in such a state where the engagement portion and the fitting portion are engaged with each other.

4. The filling device according to claim 1,
wherein the carrier member includes a cylindrical portion that constitutes the through hole, and the seat portion is formed on one end face of the cylindrical portion.

5. The filling device according to claim 4,
wherein the seat portion is formed on one end face of the cylindrical portion, and the one end face of the cylindrical portion is formed diagonally to a central axis of the cylindrical portion along a direction connecting an inlet and an outlet of the through hole.

6. The filling device according to claim 1,
wherein the carrier member includes an engagement portion,
wherein the opening/closing member includes a fitting portion that is engaged with the engagement portion of the carrier member, and
wherein the biasing portion is elastically deformed in such a state where the engagement portion and the fitting portion are engaged with each other.

7. The filling device according to claim 6,
wherein the fitting portion is formed in a columnar shaft shape, and
wherein the engagement portion includes shaft bearing portions having grooves that rotatably support the fitting portion; and claw portions that cause the fitting portion to be held in the shaft bearing portions.

8. The filling device according to claim 2,
wherein the fitting portion is formed in a columnar shaft shape, and
wherein the engagement portion receives respective both ends of the fitting portion so that the fitting portion is rotatable.

9. The filling device according to claim 6,
wherein the biasing portion is provided between the cover portion and the fitting portion.

\* \* \* \* \*